United States Patent
Yaldo et al.

(10) Patent No.: US 11,225,163 B2
(45) Date of Patent: Jan. 18, 2022

(54) ELECTRIC VEHICLE CHARGING PLATFORM

(71) Applicant: GM GLOBAL TECHNOLOGY OPERATIONS LLC, Detroit, MI (US)

(72) Inventors: Valor Yaldo, West Bloomfield, MI (US); James P. Neville, Royal Oak, MI (US); Emma Vasquez Ordonez, Farmington Hills, MI (US); Pragya Tooteja, Clawson, MI (US); William R. Venner, Milford, MI (US); Sarah Spoto, Detroit, MI (US); Jadel Davis, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 214 days.

(21) Appl. No.: 16/382,742

(22) Filed: Apr. 12, 2019

(65) Prior Publication Data
US 2020/0324667 A1    Oct. 15, 2020

(51) Int. Cl.
*B60L 53/67*   (2019.01)
*B60L 53/66*   (2019.01)
*B60L 53/14*   (2019.01)

(52) U.S. Cl.
CPC .............. *B60L 53/67* (2019.02); *B60L 53/14* (2019.02); *B60L 53/66* (2019.02); *B60L 2240/54* (2013.01); *B60Y 2200/91* (2013.01); *B60Y 2200/92* (2013.01); *B60Y 2300/91* (2013.01)

(58) Field of Classification Search
CPC .......... B60L 53/67; B60L 53/14; B60L 53/66; B60L 2240/54; B60Y 2200/91; B60Y 2200/92; B60Y 2300/91

USPC .......................................................... 320/109
See application file for complete search history.

(56) References Cited

U.S. PATENT DOCUMENTS

| 2007/0063824 | A1* | 3/2007 | Gaddy ............. | G08G 1/096783 340/426.21 |
| 2008/0014908 | A1* | 1/2008 | Vasant ............. | G08G 1/096888 455/414.1 |
| 2010/0237985 | A1* | 9/2010 | Landau-Holdsworth ..................... | B60L 8/003 340/5.8 |
| 2013/0057396 | A1* | 3/2013 | Winslow ................. | B60R 25/33 340/426.19 |
| 2013/0311658 | A1* | 11/2013 | Solomon ................. | B60L 53/64 709/225 |

(Continued)

*Primary Examiner* — Suresh Memula
(74) *Attorney, Agent, or Firm* — Lorenz & Kopf LLP

(57) ABSTRACT

In various embodiments, methods and systems are provided for controlling charging for a plurality of electric vehicles, each of the plurality of electric vehicles including a respective battery that is charged electrically via a respective charger. In one exemplary embodiment: (i) vehicle data, including respective charge statuses for the respective batteries of the plurality of electric vehicles, via sensors onboard the plurality of electric vehicles; (ii) charging station data, including respective availabilities for the plurality of charging stations, is obtained; (iii) the plurality of electric vehicles are each paired with respective charging stations, generated paired sets of electric vehicles and charging stations, based on the vehicle data and the charging station data, via a processor; and (iv) charging of respective batteries of the electric vehicles are controlled with the respective paired charging stations, via the processor.

20 Claims, 8 Drawing Sheets

(56) References Cited

U.S. PATENT DOCUMENTS

| | | | |
|---|---|---|---|
| 2015/0032516 A1* | 1/2015 | Deshpande | G06Q 50/06 705/13 |
| 2015/0158393 A1* | 6/2015 | Kawano | B60L 53/60 320/109 |
| 2017/0129349 A1* | 5/2017 | Solomon | G06Q 10/06 |
| 2017/0140349 A1* | 5/2017 | Ricci | B60L 53/665 |
| 2017/0140603 A1* | 5/2017 | Ricci | H02J 7/35 |
| 2018/0118045 A1* | 5/2018 | Gruzen | B60L 53/305 |
| 2018/0218605 A1* | 8/2018 | Mowatt | G06Q 30/0284 |
| 2018/0367731 A1* | 12/2018 | Gatti | G06K 9/00791 |
| 2019/0184850 A1* | 6/2019 | Lee | B60L 53/68 |
| 2019/0389314 A1* | 12/2019 | Zhu | B60L 53/11 |
| 2019/0389315 A1* | 12/2019 | Zhu | B60L 53/14 |
| 2020/0317084 A1* | 10/2020 | Schaffer | B60L 53/64 |
| 2020/0376972 A1* | 12/2020 | Martin | G01R 31/382 |

* cited by examiner

ELECTRIC VEHICLE CHARGING PLATFORM

BACKGROUND

The technical field generally relates to vehicles, and more particularly relates to a platform for charging electric vehicles.

Many vehicles today use an electrically charged battery for operating a motor of the vehicle. These may include pure electric vehicles (e.g., that only use motor(s) powered by an electrically charged battery) as well as hybrid electric vehicles (which include one or more motors that are powered by an electrically charged battery as well as one or more additional types of motors, such as an internal combustion engine). For the purposes of this Application, such vehicles (including both pure electric vehicles and hybrid electric vehicles) shall be collectively referred to as "electric vehicles".

Many electric vehicles (e.g., pure electric vehicles and plug-in hybrid vehicles) have an electric charger that charges the vehicle's battery when connected to a charging station. It may be desirable to provide improved methods and systems for charging electric vehicles.

Accordingly, it may be desirable to provide improved methods and systems for charging electric vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided for controlling charging for a plurality of electric vehicles, each of the plurality of electric vehicles including a respective battery that is charged electrically via a respective charger, that includes: (i) obtaining vehicle data from the plurality of electric vehicles, the vehicle data including respective charge statuses for the respective batteries of the plurality of electric vehicles, via sensors onboard the plurality of electric vehicles; (ii) obtaining charging station data pertaining to a plurality of charging stations, the charging station data including respective availabilities for the plurality of charging stations; (iii) pairing one or more of the plurality of electric vehicles each with a respective one of the plurality of charging stations, generated paired sets of electric vehicles and charging stations, based on the vehicle data and the charging station data, via a processor; and (iv) controlling charging of respective batteries of the one or more of the plurality of electric vehicles with the respective paired charging stations, via the processor.

Also in one embodiment, wherein the pairing of a particular one of the plurality of electric vehicles with a respective one of the plurality of charging stations is made at least in part based on the respective charging statuses of the particular one of the plurality of electric vehicles and at least one other of the plurality of electric vehicles that is currently using one of the plurality of charging stations.

Also in one embodiment, the availability for a particular charging station is based at least in part on a schedule of available days and times of days that have previously established for the particular charging station.

Also in one embodiment, the availability for a particular charging station is based at least in part on a charging status of the charging status of a particular electric vehicle that is currently using the particular charging station.

Also in one embodiment, the method further includes: for a particular electric vehicle and a particular charging station that is paired with the particular electric vehicle: (i) providing, to an owner of the particular charging station, rating information pertaining to the particular electric vehicle that is paired with the particular charging station; and (ii) allowing the owner of the particular charging station to accept or reject charging of the battery of the particular electric vehicle via the particular charging station, based on the rating information.

Also in one embodiment, the rating information pertaining to the vehicle is based at least in part on a driving history of the vehicle.

Also in one embodiment, the method further includes: (i) monitoring usage of the particular charging station by the particular electric vehicle as the particular electric vehicle is charged at the particular charging station; and (ii) updating the rating information for the particular electric vehicle based on the monitoring.

Also in one embodiment, the monitoring is performed using a camera that is embedded within the particular electric vehicle.

Also in one embodiment, the method further includes, for a particular electric vehicle and a particular charging station that is paired with the particular electric vehicle: (i) providing, to a user of the particular electric vehicle, rating information pertaining to the particular charging station that is paired with the particular electric vehicle; and (ii) allowing the user of the particular electric vehicle to accept or reject charging of the battery of the particular electric vehicle via the particular charging station, based on the rating information.

Also in one embodiment, the method further includes: (i) monitoring conditions of the particular charging station as the particular electric vehicle is charged at the particular charging station; and (ii) updating the rating information for the particular charging station based on the monitoring.

Also in one embodiment, the method further includes initiating an online chat between two or more of the plurality of vehicles based at least in part on the vehicle data, including a state of charge for one or more of the plurality of vehicles.

Also in one embodiment, the pairing of the one or more of the plurality of electric vehicles each with a respective one of the plurality of charging stations is also based on respective ratings of the plurality of electric vehicles and the plurality of charging stations, in combination with respective rating thresholds thereof for pairing.

Also in one embodiment, the availability of the particular charging station is enforced via instructions provided by the processor that automatically disconnects charging capability for the charging station for days and times in which the owner has decided that the charging station is to be unavailable.

Also in one embodiment, only certain users of electric vehicles, belonging to an allowed users list, are allowed to use the charging station during dates and times when the charging station is not scheduled to be available to the public.

Also in one embodiment, the vehicle data and the charging station data are obtained regardless of whether a particular electric vehicle is currently plugged into a charging station, and regardless of whether or not a particular charging station is currently being used to charge an electric vehicle.

Also in one embodiment, the capturing of photographic images via the camera is trigged by one or more vehicle actions.

Also in one embodiment, the method further includes obtaining feedback from the user of a particular electric vehicle with respect to a particular charging station used by the particular electric vehicle.

In another exemplary embodiment, a system is provided for controlling charging for a plurality of electric vehicles, each of the plurality of electric vehicles including a respective battery that is charged electrically via a respective charger, that includes a plurality of sensors and a processor. The plurality of sensors are disposed onboard the plurality of electric vehicles, and are configured to obtain vehicle data from the plurality of vehicles, the vehicle data including respective charge statuses for the respective batteries of the plurality of electric vehicles. The processor is configured to at least facilitate: (i) obtaining charging station data pertaining to a plurality of charging stations, the charging station data including respective availabilities for the plurality of charging stations; (ii) pairing one or more of the plurality of electric vehicles each with a respective one of the plurality of charging stations, generated paired sets of electric vehicles and charging stations, based on the vehicle data and the charging station data; and (iii) controlling charging of respective batteries of the one or more of the plurality of electric vehicles with the respective paired charging stations.

Also in one embodiment, the system further includes a camera that is embedded within the particular electric vehicle; wherein the processor is configured to at least facilitate, for a particular electric vehicle and a particular charging station that is paired with the particular electric vehicle: providing, to an owner of the particular charging station, rating information pertaining to the particular electric vehicle that is paired with the particular charging station; allowing the owner of the particular charging station to accept or reject charging of the battery of the particular electric vehicle via the particular charging station, based on the rating information; monitoring usage of the particular charging station by the particular electric vehicle, using images provided by the camera, as the particular electric vehicle is charged at the particular charging station; and updating the rating information for the particular electric vehicle based on the monitoring.

In another exemplary embodiment, a communication system is provided that includes an electric vehicle and a remote server. The electric vehicle includes an electric motor; a battery for powering the electric motor; a charger for electrically charging the battery; and a plurality of sensors disposed onboard the electric vehicle and configured to generate vehicle data including a charge status for the battery. The remote server is disposed remote from the electric vehicles, the remote server including a processor that is configured to at least facilitate: (i) obtaining the vehicle data from the plurality of sensors; (ii) obtaining charging station data pertaining to a plurality of charging stations, the charging station data including respective availabilities for the plurality of charging stations; (iii) pairing the electric vehicle with a particular one of the charging stations, based on the vehicle data and the charging station data; and (iv) controlling charging of the battery with the particular one of the charging stations.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
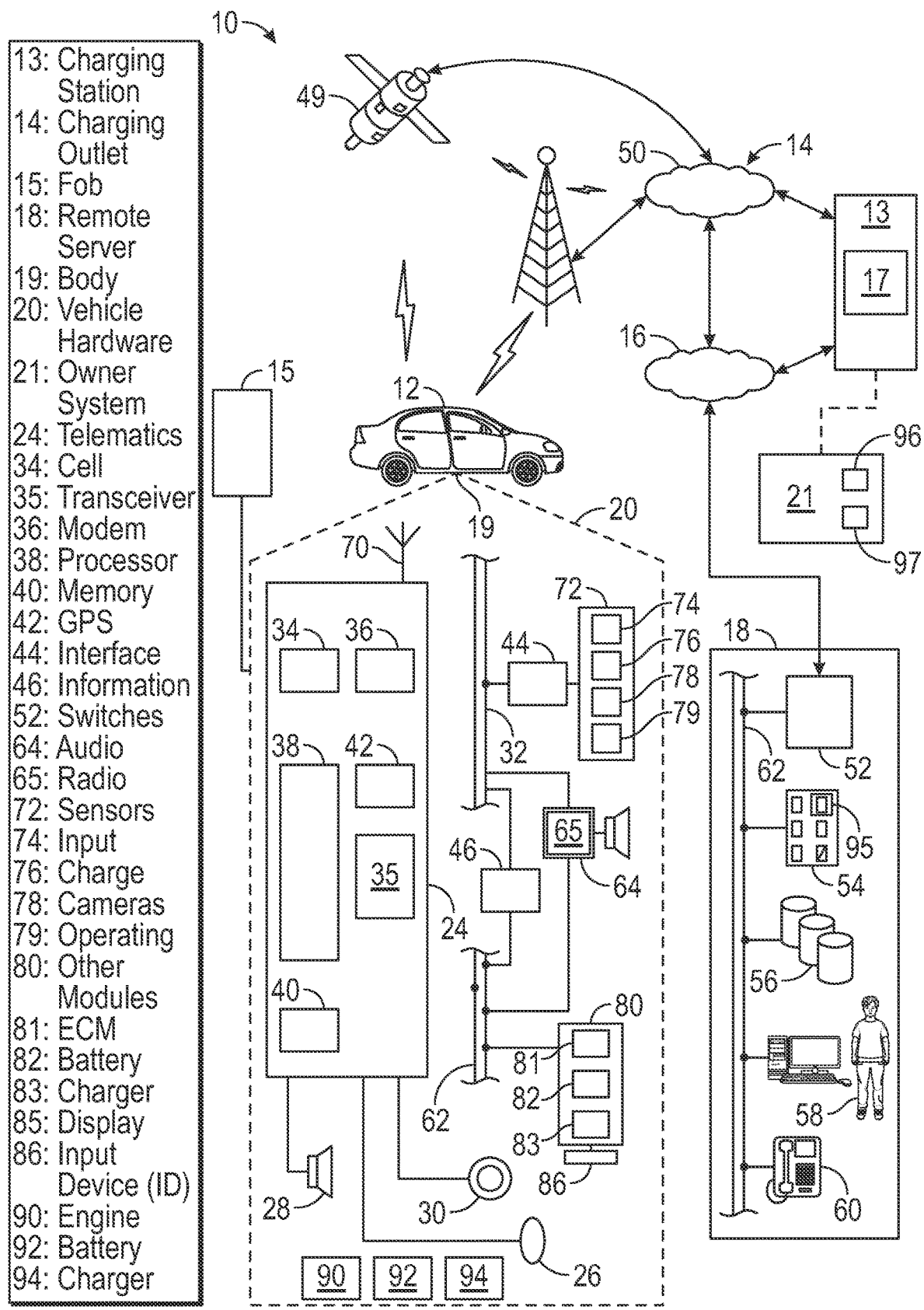
FIG. 1 is a functional block diagram of a communications system that includes an electric vehicle, and that is configured to charging of the electric vehicle via a charging station, in accordance with exemplary embodiments.

FIG. 1 is a functional block diagram of a communications system 10, in accordance with an exemplary embodiment. As described in greater detail further below, the communications system 10 generally includes a vehicle 12, along with one or more charging stations 13, one or more wireless carrier systems 14, one or more land networks 16, and one or more remote servers 18.

As described in greater detail below, in various embodiments the communications system 10 controls charging of the vehicle 12 (and other vehicles in a fleet of electric vehicles) via usage of and selective pairing with the charging station 13 (and other charging stations in a network of charging stations), based on vehicle data and charging station data that includes information as to the state of charge of the vehicles, the availability of the charging stations, and rating information pertaining to the electric vehicles and the charging stations.

In various embodiments, the vehicle 12 comprises an electric vehicle (e.g., a pure electric or hybrid electric vehicle, per the discussion above). In various embodiments, the vehicle 12 includes an electric motor/engine 90 that runs a battery 92 that is charged via an electric charger 94.

In addition, in various embodiments, the vehicle 12 is part of a plurality of vehicles (e.g., a fleet of vehicles) that utilize a plurality of different charging stations 13 (as a network of charging stations utilized by the fleet of electric vehicles). As described in greater detail further below, in various embodiments, the communications system 10 provides a platform for control of electric charging for the vehicle 12 (and other vehicles) via the charging station 13 (and/or other charging stations).

As noted above, in various embodiments, the charging station 13 is part of a network of charging stations that the fleet of electric vehicles may utilize for charging. In various embodiments, each charging station 13 includes a charging outlet 17 for charging of the charger 94 of the vehicle 12. In addition, also in various embodiments, the charging station 13 includes or is coupled with one or more owner systems 21 (e.g., a computer, table, smart phone, or the like, including a computer processor 96 and a computer memory 97 therein) by which an operator or owner of the charging station 13 can control operation of the charging station 13 (e.g., by establishing days and times for availability of the charging station 13, selectively allowing usage of the charging station 13 by the vehicle 12 and/or other vehicles in the fleet, and so on). As used herein, an "owner" refers to an individual or group of individuals that owns, operates, or otherwise controls a particular charging station. Also as used herein, a "user" refers to an individual or group of individuals that drives, operates, owns, or otherwise uses or utilizes an electric vehicle.

It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

In various embodiments, each vehicle 12 may be any type of mobile electric vehicle such as an automobile, motorcycle, car, truck, recreational vehicle (RV), or the like, and is equipped with suitable hardware and software that enables it to communicate over communications system 10. As shown in FIG. 1, in various embodiments the vehicle hardware 20 is disposed within a body 19 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. In various embodiments, the vehicle 12 has an engine (or motor) 90. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device, embedded within the vehicle 12, that provides a variety of services through its communication with the remote server 18, and generally includes an electronic processing device (processor) 38, one or more types of electronic memory 40, a cellular chipset/component 34, a transceiver 35, a wireless modem 36, a dual mode antenna 70, and a navigation unit containing a GPS chipset/component 42. In one example, the wireless modem 36 includes a computer program and/or set of software routines adapted to be executed within electronic processing device 38. Also in various embodiments, the transceiver 35 is configured to transmit, to one or more remote destinations (e.g., the remote server 18 of FIG. 1) and/or the charging station 13, data pertaining to the vehicle 12 (e.g., including vehicle sensor data including a charge status of the vehicle 12, a driving history of the vehicle, and photographic images pertaining to the use of the charging station 13 by the vehicle 12).

In various embodiments, the telematics unit 24 is embedded and installed (and built-in) within the vehicle 12 at the time of manufacture. In various embodiments, the telematics unit 24 enables voice and/or data communications over one or more wireless networks (e.g., wireless carrier system 14), and/or via wireless networking, thereby allowing communications with the remote server 18, the charging station 13, and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including providing data pertaining to the vehicle 12 (e.g., including vehicle sensor data including a charge status of the vehicle 12, a driving history of the vehicle, and photographic images pertaining to the use of the charging station 13 by the vehicle 12.

In various embodiments, the telematics unit 24 obtains vehicle-related information from various vehicle sensors 72, connected to various sensor interface modules 44 are operatively connected to the vehicle bus 32. In various embodiments, the vehicle sensors 72 include user input sensors 74, charge sensors 76, cameras 78, and operating sensors 79, described below. In various embodiments, the vehicle sensors 72 may also include any number of other sensors, such as by way of example, wheel speed sensors, accelerometers, steering angle sensors, braking system sensors, gyroscopes, magnetometers, emission detection, and/or control sensors, and the like. Example sensor interface modules 44 include powertrain control, climate control, and body control, to name but a few.

In various embodiments, the input sensors 74 are utilized to detect inputs from the user with respect to operation of various vehicle components. For example, in various embodiments, the input sensors 74 detect requests by the user to remotely start the vehicle 12, to operate the vehicle 12, to charge the vehicle 12, acceptance or rejection of a proposed charging station pairing, and feedback pertaining to the charging station utilized. In various embodiments, the input sensors 74 may also detect user requests as to a particular destination for travel for the vehicle 12, and/or requests for climate control and/or infotainment, and so on, among other possible information. In certain embodiments, the input sensors 74 are part of and/or coupled to an electronic device 15 (e.g., a keyfob, smart phone, or other electronic device) and/or one or more of the hardware components 20 and/or controls 30, and/or to one or more other vehicle modules 80, such as one or more engine control modules 81 (e.g., controlling operation of the motor/engine 90), battery control modules 82 (e.g., controlling operation of the battery 92), charging modules 83 (e.g., controlling or facilitating pairing of the vehicle 12 with a charging station 13 for charging of the battery 92), display modules 85 (e.g., providing audio and/or visual displays for the user, including notifications of a charge status of the vehicle 12 and nearby charging stations 13), and/or other control modules that control different functionality for the vehicle 12, that may be connected to one another and to telematics unit 24 via the communications bus 62. For example, in various embodiments, the input sensors 74 may be part of and/or coupled to controls 30 for the electronic device 15 and/or to one or more hardware components 20 and/or various input devices 86 for use with other vehicle modules 80, such as one or more touch screens, push buttons, dials, switches, knobs, levers, or the like.

In various embodiments, the charge sensors 76 measure a state of charge of the battery 92. In various embodiments, the charge sensors 76 are built into the vehicle, and are attached to, built into, and/or otherwise coupled to the battery 92. Also in various embodiments, the cameras 78 are built into the vehicle, and are attached to, built into, and/or otherwise coupled to the mounted on the vehicle 12 (e.g., on a rear portion of the vehicle 12), and capture images of a region surrounding the vehicle 12, including when the battery 92 is charging via a charging station 13. In addition, in various embodiments, various different operating sensors 79 obtain measurements as to a user's operation of the vehicle 12 (e.g., including braking, steering, acceleration, and the like), for use in determining a driving history for the vehicle 12.

In certain embodiments, the telematics unit 24 analyzes the vehicle data received from the GPS chipset/component 42 and the vehicle sensors 72, as well as data pertaining to the charging station 13. Also in various embodiments, the telematics unit 24 determines when the vehicle 12 requires a charge for the battery 92, and facilitates pairing of the vehicle 12 with a charging station 13 for electric charging of the battery 92.

In addition, in various embodiments, the telematics unit 24 may also provide other services, such as, by way of example: turn-by-turn directions and other navigation-related services provided in conjunction with the GPS chipset/component 42, emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

The wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54 (e.g., including one or more computer processors 95), databases (including computer memory) 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The transceivers 35, and/or modem or other telecommunication/computer equipment 60 may include an encoder, as previously explained, and can be connected to various devices such as a server 54 and database 56. In various embodiments, the database 56 of the remote server 18 comprises a computer memory that stores information pertaining to vehicle 12 data including a charge status of the vehicle 12, a driving history of the vehicle 12, ratings for the vehicle 12, user feedback with respect to charging stations utilized by the vehicle 12, other information and ratings pertaining to charging stations 13, and the like. Although the illustrated example has been described as it would be used in conjunction with a remote server 18 that is manned, it will be appreciated that the remote server 18 can be any central or remote facility, manned or unmanned, mobile or fixed, to or from which it is desirable to exchange voice and data.

Figure 2:
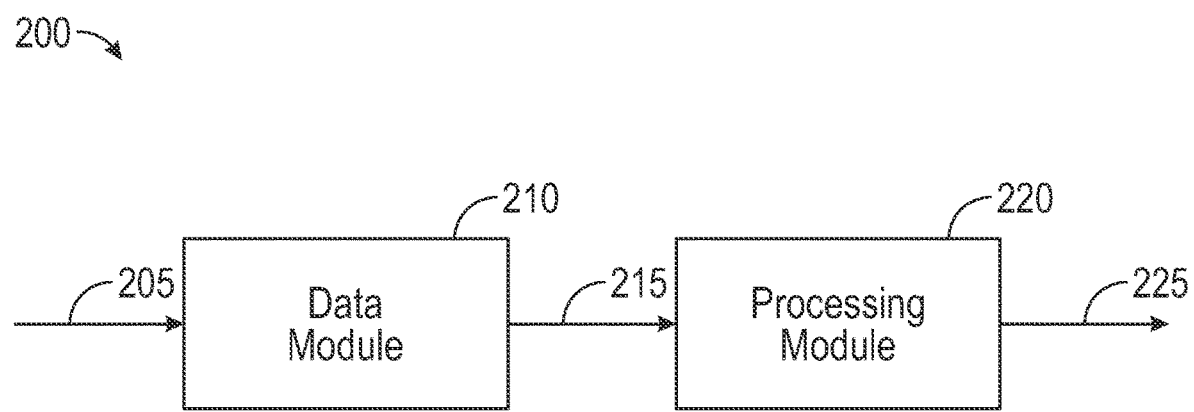
FIG. 2 is a block diagram of modules of the communications system of FIG. 1, in accordance with exemplary embodiments.

FIG. 2 provides a functional block diagram for modules of the communications system 10 of FIG. 1, in accordance with exemplary embodiments. In various embodiments, each module includes and/or utilizes computer hardware, for example via one or more computer processors and memory. As depicted in FIG. 2, in various embodiments, the communications system 10 generally includes a data module 210 and a processing module 220. In various embodiments, the data module 210 and the processing module 220 are disposed onboard the vehicle 12. In certain embodiments, certain module(s) be disposed, at least in part, as part of the remote server 18 of FIG. 1.

In various embodiments, the data module 210 collects vehicle data via the GPS chipset/component 42 and the sensors 72 of FIG. 1. In various embodiments, the data module 210 utilizes the GPS chipset/component 42 for detecting a location of the vehicle 12 over time. Also in various embodiments, the data module 210 collects data from various sensor 72 with respect to vehicle data pertaining to the vehicle 12 (for example, including data as to a charge of the vehicle 12 and an operating history of the vehicle 12, and images with respect to the vehicle 12's usage of the charging station 13). In addition, in various embodiments, the data module 210 collects information as to ratings for the vehicle 12 (and various other vehicles in the fleet) for example from databases such as from the memory 40 of the vehicle 12, the databases 56 of the remote server 18, and/or the owner systems 21 associated with the charging stations.

Also in various embodiments, the data module 210 collects information regarding the charging station 13 (and other charging stations in the network), such as dates and time of availability, electricity usage and costs for usage of the charging station (e.g., including costs of electricity for the charging station at particular days/times), and ratings for the charging stations. In various embodiments, the data module 210 collects the charging system information from one or more databases, such as from the memory 40 of the vehicle 12, the databases 56 of the remote server 18, and/or the owner systems 21 associated with the charging stations.

In addition, in various embodiments, the data module 210 provides information pertaining to the collected vehicle data and charging system data as outputs 215 of the data module 210 for use by the processing module 220, for example as discussed below.

In various embodiments, the processing module 220 utilizes the data from the data module 210 and controls instructions for charging of the battery 92 of the vehicle 12. Specifically, in various embodiments, the processing module 220 utilizes the vehicle data (e.g., as to the location, state of charge, and ratings for the vehicles) and the charging station data (e.g., as to the availability and ratings for the charging stations), and selectively pairs the vehicles with respective charging stations. In addition, in certain embodiments, the processing module 220 transmits information regarding the paired vehicles and charging stations, along with respective information and ratings regarding each, to users of the respective vehicles and owners (or operators) of the respective charging stations, which allows the users of the vehicles and the owners of the charging stations the ability to accept or reject the proposed pairings.

In various embodiments, the processing module 220 provides information regarding the pairings and the instructions for charging of the vehicles using the charging stations to the vehicles and charging stations (and/or respective users and/or owners thereof) as outputs 225 of the processing module 220.

Figure 3:
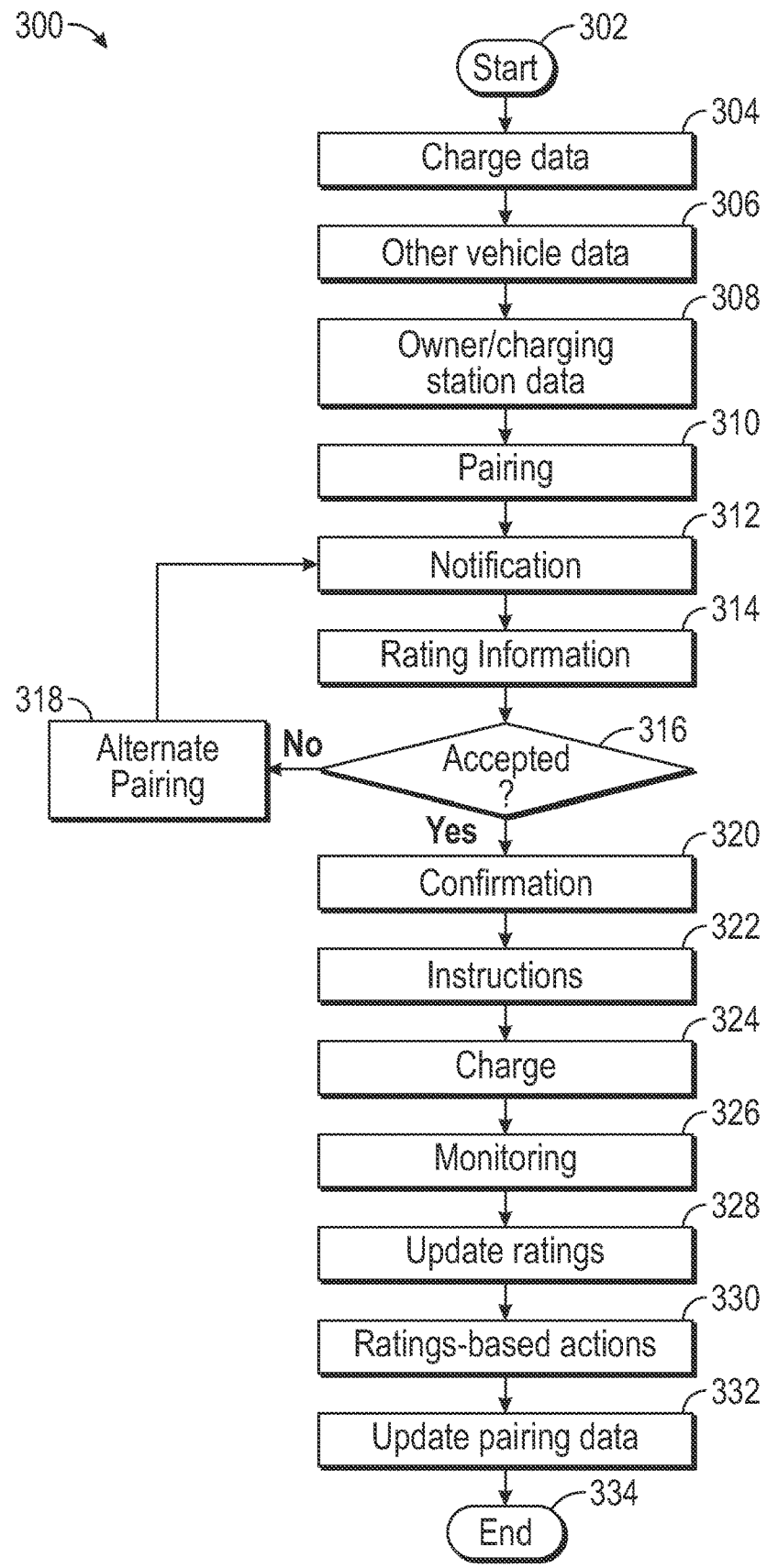
FIG. 3 is a flowchart of a process for controlling charging of an electric vehicle via a charging station, and that can be used in connection with the communications system of FIGS. 1 and 2, including the vehicle and charging station thereof of FIG. 1 and the modules of FIG. 2, in accordance with exemplary embodiments.

FIG. 3 is a flowchart of a process 300 for controlling charging of an electric vehicle via a charging station, in accordance with various embodiments. In various embodiments, the process 300 can be used in connection with the communications system 10 of FIGS. 1 and 2, including the vehicle 12 and charging station 13 thereof of FIG. 1 and the modules of FIG. 2, in accordance with exemplary embodiments.

As depicted in FIG. 3, in various embodiments the process 300 begins at step 302. For example, in various different embodiments, the process 300 may begin when the vehicle 12 is turned on and/or begins travelling, and/or when one or more users of the vehicle 12 approach or enter the vehicle 12, when a user request has been received, and/or when a user request and/or use of the vehicle 12 is expected. In certain embodiments, the steps of the process 300 are performed continuously during operation of the vehicle 12.

In various embodiments, vehicle charge data is received at 304. In certain embodiments, data is obtained as to a state of charge for the battery 92 of the vehicle 12 (and for all of the vehicles in the fleet), using data from the charge sensors 76 of each of the vehicles in the fleet. In certain other embodiments, vehicle charge data may be manually inputted by a user of the vehicle 12, for example via an electronic device 15 (e.g., fob, smart phone, or the like) and/or via one or more input devices 86 of the vehicle 12 (e.g., via a touch screen display). In various embodiments, the vehicle charge data is obtained regardless of whether or not a particular electric vehicle is currently plugged into a charging station, and regardless of whether or not a particular charging station is currently being used to charge an electric vehicle.

Figure 4:
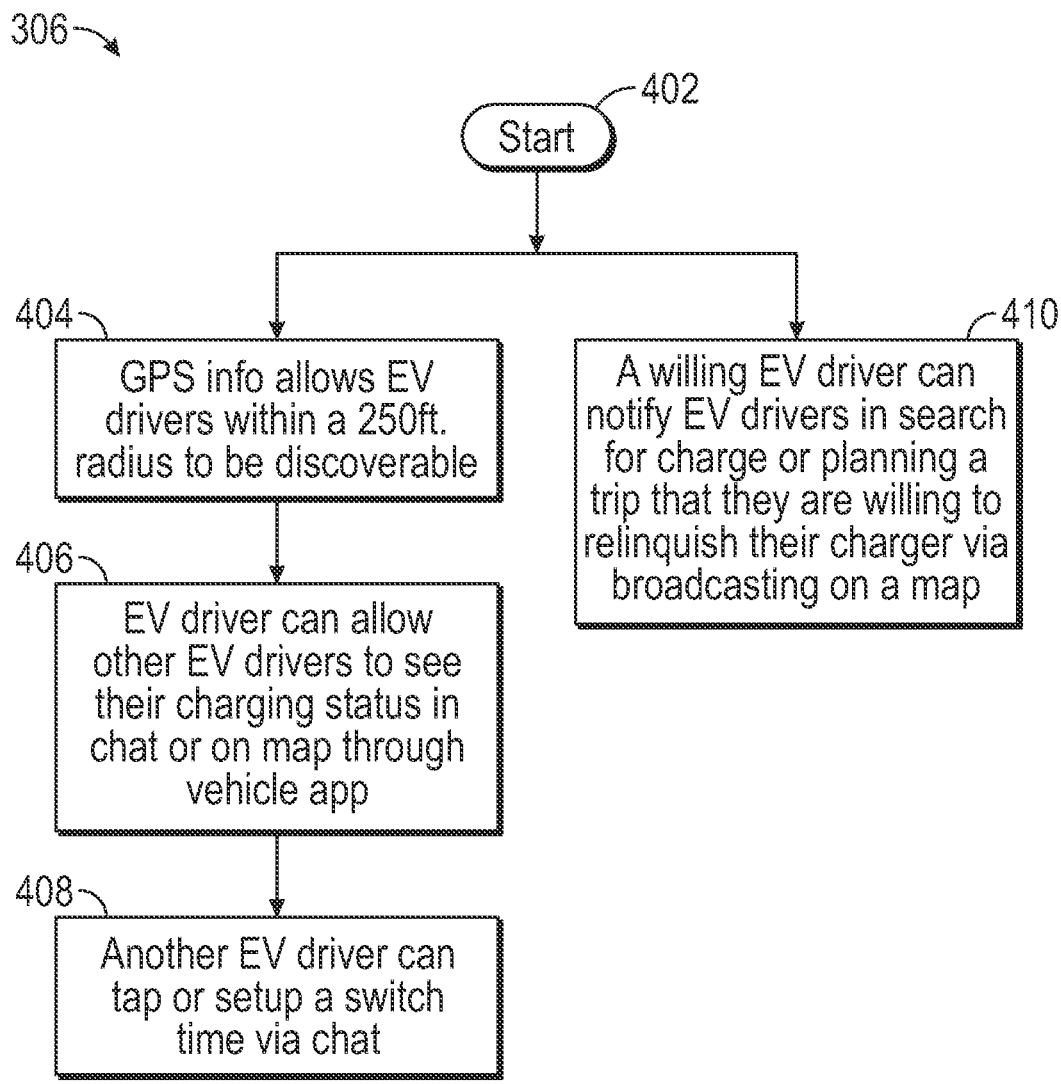
FIG. 4 is a flowchart of a sub-process of the process of FIG. 3, namely the sub-process of obtaining user data for charging of electric vehicle, in accordance with exemplary embodiments.

With reference to FIG. 4, a flowchart is provided for an illustration as to certain exemplary embodiments of the collection of vehicle charge data of step 304. Specifically, in the embodiment of FIG. 4, once the process is started at 402, vehicle location data (e.g., from the GPS chipset/component 42) is utilized at 404 to discover electric vehicles (and their associated users) within a reasonable radius of one another (and/or within a reasonable radius of nearby charging stations). In one embodiment, a two hundred fifty-foot (250 ft) radius is utilized; however, this may vary in other embodiments.

Also in certain embodiments, at 406 the charge status of the vehicle 12 is provided (e.g., via the transceiver 35 of FIG. 1) to other vehicles in the fleets (or their respective users). In certain embodiments, the charge status is also provided directly to the charging stations (or their respective owners).

In addition, in certain embodiments, at 408, users of different electric vehicles may also tap or set-up a time to chat with one another regarding possible switching of charging positions (e.g., one electric vehicle may seek to take over charging at a particular charging station when a previous electric vehicle is finished at that particular charging station, and so on). In addition, in certain embodiments, at 410, a user of one electric vehicle may notify users of other electric vehicles in search for a charge or planning a trip, or the like, that the user is willing to relinquish his or her charger via broadcasting on a map that is visible via the users of each of the vehicles (e.g., via respective displays 85 and/or electronic devices 15 thereof). In various embodiments, an online chat session and/or chat messaging is are initiated based on vehicle data for the different vehicles, including the state of charge of the respective vehicles (and, for example, indications of which vehicles may require charging, which vehicles may be finished or nearly finished charging, which vehicles may be able to other vehicles' place at a charging station, and so on).

With reference back to FIG. 3, also in certain embodiments, additional vehicle data is obtained at 306. In various embodiments, the additional vehicle data includes data as to one or more ratings for the vehicles and/or the users thereof. For example, in various embodiments, each vehicle is assigned a rating based on data pertaining to prior encounters between the vehicle and various charging stations (e.g., including whether the charging station was used in accordance with instructions and guidelines, and conditions for which the charging stations were left following usage, and so on). In certain embodiments, the additional vehicle data and/or ratings may also incorporate information pertaining to a driving history for the vehicle (e.g., including whether the vehicle has typically been driven in an aggressive and/or non-aggressive manner, and so on, based on data from the operating sensors 79 of FIG. 1). For example, the driving history (and/or vehicle history) used for the rating for the driver (or the driver's vehicle) may include, among other criteria, acceleration and/or deceleration history (e.g., as obtained via an accelerometer of the vehicle), history of interactions with other vehicles on the road (e.g., whether the driver aggressively moves into another vehicle's lane instead of providing the right of way, and/or whether the driver follows other vehicles too closely, and so on), among other possible criteria pertaining to driving history. In certain embodiments, a driver rating incorporates the driving history as well as data obtained via the vehicle and/or charging stations used by the vehicle (such as by way of example, photographs taken pertaining to the user's use of the charging station and conditions left by the user, and/or data as to proper usage of the charging station by the user, and so on). In various embodiments, the driver ratings (and, in certain embodiments, the driving history) are stored in memory in one or more databases (e.g., of the memory 40, databases 56, and/or systems 21 of FIG. 1). In various embodiments, the additional vehicle data is obtained regardless of whether or not a particular electric vehicle is currently plugged into a charging station, and regardless of whether or not a particular charging station is currently being used to charge an electric vehicle.

Also in certain embodiments, charging station data is obtained at 308. In various embodiments, the charging station data includes data as to availability (e.g., dates and times) for the charging stations, as well as one or more ratings for the charging stations and/or owners (and/or operators) thereof. For example, in various embodiments, the owner of a particular charging station may establish certain days of the week, dates, and times for which the charging station is available for usage by vehicles in the fleet. Also in various embodiments, the charging station data further includes one or more ratings for the charging station. For example, in various embodiments, each charging station is assigned a rating based on data pertaining to prior encounters between the charging station and various vehicles (e.g., including whether the charging station's conditions and performance satisfied applicable guidelines, and so on), and/or based on electricity usage and/or charging costs associated with the charging station. In various embodiments, the charging station availability and ratings are stored in memory in one or more databases (e.g., of the memory 40, databases 56, and/or systems 21 of FIG. 1). In various embodiments, the charging station data is obtained regardless of whether or not a particular electric vehicle is currently plugged into a charging station, and regardless of whether or not a particular charging station is currently being used to charge an electric vehicle.

Figure 5:
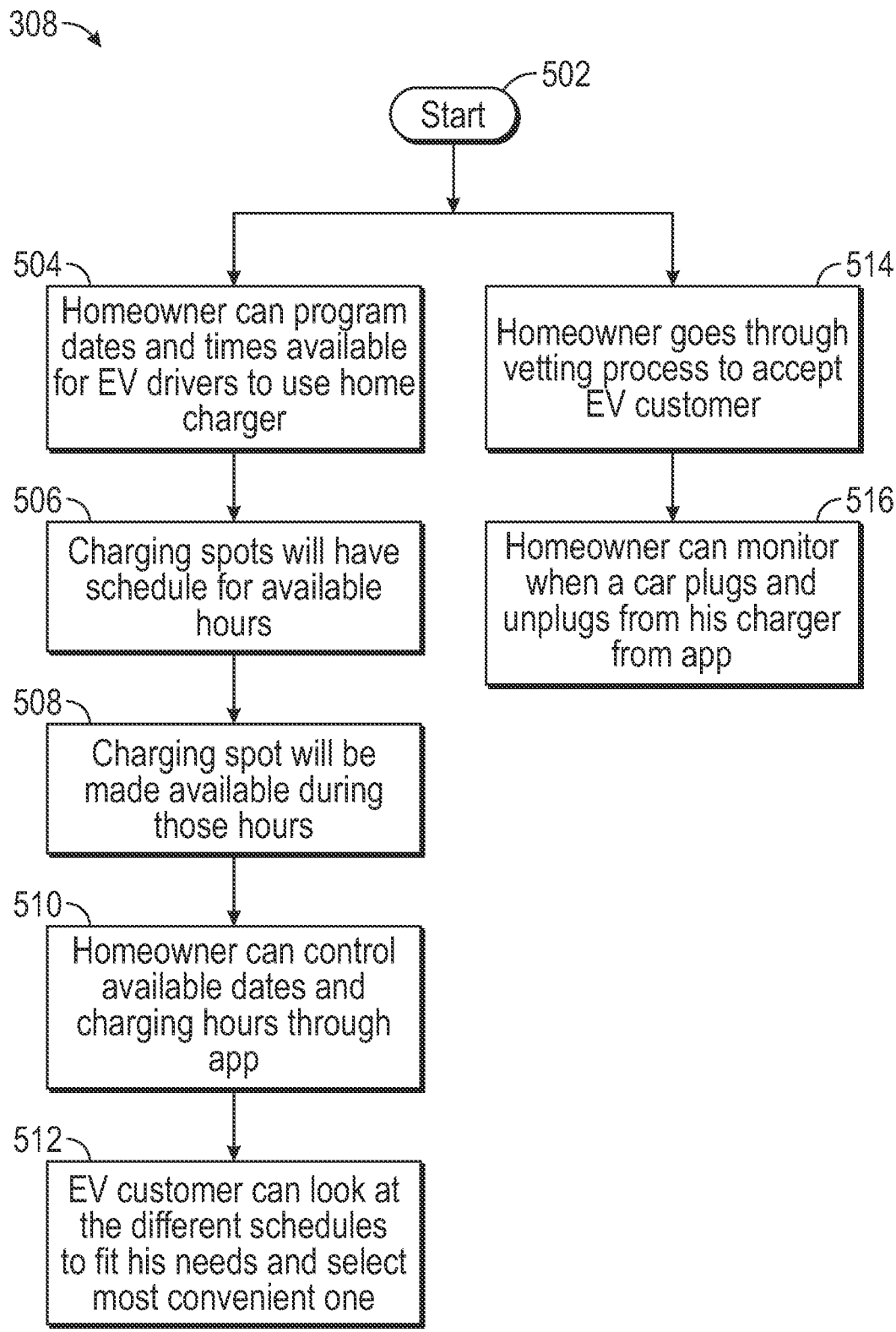
FIG. 5 is a flowchart of a sub-process of the process of FIG. 3, namely the sub-process of obtaining owner data for charging of electric vehicle, in accordance with exemplary embodiments.

With reference to FIG. 5, a flowchart is provided for an illustration as to certain exemplary embodiments of the collection of charging station data of step 308. Specifically, in the embodiment of FIG. 5, once the process is started at 502, the owner of the charging station (e.g., the owner or manager of the house, building, and/or location in which the charging station is located, in certain embodiments) may program dates and times for which the charging station will be made available (e.g., using the owner's computer, tablet, smart phone, and/or other system 21 of FIG. 1). In various embodiments, this may include a schedule of availability at 506 with respect to days of the week and times in general, and/or specific calendar dates of the month with times at 508, for the schedule. In various embodiments, the owner of the charging station may also actively control or change the available dates/times at any time via updating the availability at 510. In addition, in various embodiments, at 512 users of electric vehicles may examine different schedules of nearby charging stations to fit the users' needs, and/or to select the most convenience charging station(s) for the user.

In addition, in certain embodiments, the availability of a particular charging station may further be enforced via instructions provided by a processor that automatically disconnects charging capability for the charging station (e.g., by automatically disconnecting power thereto) for days and times in which the owner has decided that the charging station is to be unavailable. For example, this could alleviate a potential problem in which a particular user of an electric vehicle might otherwise overstay the scheduled time at the charging station and/or might otherwise have stumbled upon the charging station based on prior knowledge or experience with the charging station) In addition, in certain embodiments, the owner of the charging station may also create a list of certain allowed individuals (e.g., certain friends and family) that are allowed to use the charging station even when the charging station is not scheduled to be available to the public. For example, in certain embodiments, instructions are provided by a processor that automatically allows for charging capability for the charging station (e.g., by automatically allowing power thereto) only for the "friends and family" on the allowed list (e.g., as determined by detection of a vehicle number associated with a vehicle on the allowed list, and/or direction of a mobile device for a user on the allowed list, and so on).

Figure 6:
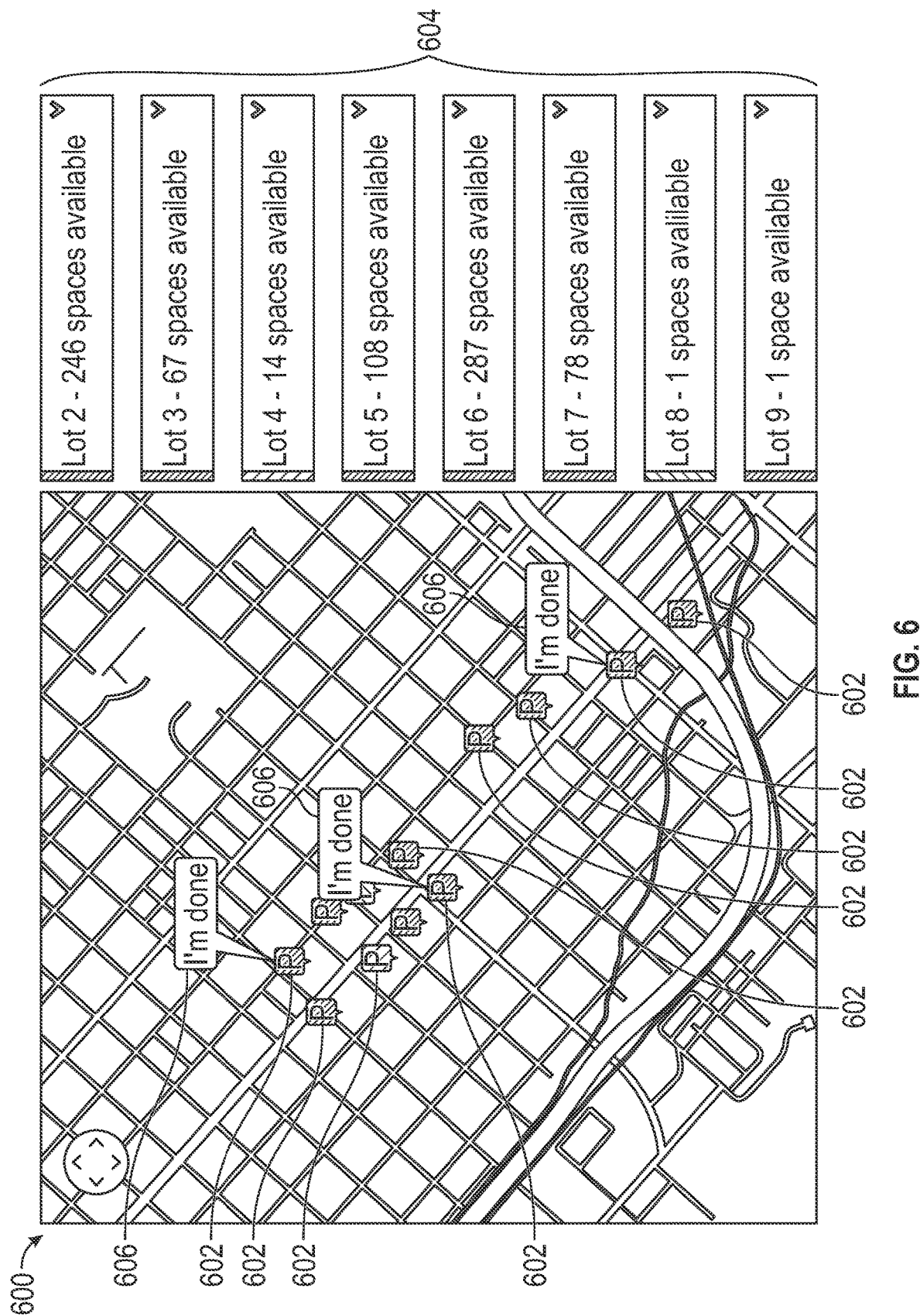
FIG. 6 is an illustration of an exemplary display for showing available charging stations for electric vehicles, and that can be utilized in connection with the communications system of FIG. 1, the modules of FIG. 2, and the process of FIG. 3, including the sub-processes of FIGS. 4 and 5, in accordance with exemplary embodiments.

FIG. 6 is an illustration of an exemplary display 600 for showing available charging stations for electric vehicles, in accordance with exemplary embodiments. As shown in FIG. 6, in various embodiments the display 600 includes a map of roadways and locations with respect to a particular distance radius. Various charging stations 602 are represented on the map, along with an availability status for the charging station 602. Specifically, in various embodiments, the availability of each charging station 602 is represented by the following: (i) depicting the charging station 602 in a particular color based on the availability of the charging station 602; (ii) depicting a summary status 604 for each of the charging stations reflecting the availability of the particular charging station; and (iii) displaying any recent messages 606 from owners of particular charging stations and/or users of electric vehicles using the particular charging stations.

For example, in various embodiments, a charging station may be deemed to be currently available if the current date and time align with the scheduled availability of the charging station and there is not another electric vehicle that is using the charging station (or that is scheduled to use the charging station in the near future). In such embodiments, the charging station 602 may be depicted in a first color, such as green. Also in certain embodiments, the charging station 602 will be listed as currently available in the summary status 604, along with any additional information that is posed (e.g., as to how long the scheduled availability extends, or the like).

By way of additional example, in various embodiments, a charging station may be deemed to be available soon if the current date and time align with the scheduled availability of the charging station and an electric vehicle that is currently using the charging station has almost completed its charging (e.g., so that the charging will be completed soon, for example in a matter of minutes). In addition, a charging station may also be deemed to be available soon if the charging station scheduled availability will occur shortly (e.g., in a manner of minutes) and no other electric vehicle is scheduled to use the charging station in the near future. In such embodiments, the charging station 602 may be depicted in a second color, such as yellow. Also in certain embodiments, the charging station 602 will be listed as available soon in the summary status 604, along with any additional information that is posed (e.g., as to when the scheduled availability will begin, and/or when an electric vehicle that is currently using the charging station is expected to be finished, or the like).

By way of additional example, in various embodiments, a charging station may be deemed to be unavailable if any one or more of the following conditions are present, namely that: (i) the current date and time either do not align with the scheduled availability of the charging station and an electric vehicle (and will not align in the near future); (ii) another electric vehicle is using the charging station and is not nearing completion of the charge; and/or (iii) one or more other electric vehicles are scheduled to be using the charging station in the near future. In such embodiments, the charging station 602 may be depicted in a third color, such as red.

Also in certain embodiments, the charging station 602 will be listed as unavailable in the summary status 604, along with any additional information that is posed (e.g., as to periods of scheduled unavailability and/or other electric vehicles using or scheduled to use the charging station, or the like).

In certain embodiments, as used herein, the terms "near future", "soon", "shortly", "almost available", or "almost completed" (or the like) may comprise a predetermined number of minutes (e.g., less than an hour in one embodiment; less than thirty minutes, in another embodiment; or less than ten minutes, in yet another embodiment)—however, this may vary in other embodiments.

With reference back to FIG. 5, in certain embodiments, the charging stations are also vetted at 514. In various embodiments, the owners of the various charging stations are vetted (e.g., via inquiries submitted, and/or data collected, via the remote server 18 of FIG. 1) with respect to prior usage of the charging stations (e.g., via the above-described ratings that incorporate conditions and performance of the charging stations). Finally, as reflected at 516 of FIG. 5, in various embodiments, at 516, the owner of the charging station may also monitor when vehicles plug and unplug their respective chargers into and out of the charging station (e.g., via an application, message, or other notification of the owner's computer, tablet, smart phone, or other system 21 of FIG. 1). In addition, in certain embodiments, per the discussion above, the availability of a particular charging station may further be enforced via instructions provided by a processor that automatically disconnects charging capability for the charging station (e.g., by automatically disconnecting power thereto) for days and times in which the owner has decided that the charging station is to be unavailable; and/or the owner of the charging station may also create a list of certain allowed individuals (e.g., certain friends and family) that are allowed to use the charging station even when the charging station is not scheduled to be available to the public.

With reference back to FIG. 3, in various embodiments, proposed pairings are made at 310. In various embodiments, each vehicle requiring a charge is paired up with a corresponding respective charging station as a potential match, based on the vehicle data of steps 304, 306 and the charging station data of step 308. For example, in various embodiments, the pairings are made based on a proximity of geographic locations between the vehicles requiring a charge and the charging stations with charging availability, along with an alignment of when the electric vehicle needs to be charged versus the availability of particular charging stations. In certain embodiments, the pairing is performed automatically via the processing module 220 of FIG. 2, via one or more computer processors (e.g., via the processor 38 of FIG. 1, and/or one or more processors of the servers 54 and/or system 21 of FIG. 1). In certain other embodiments, the pairing may also be generated based on conversations between certain users of electric vehicles and respective owners of charging stations (e.g., via an online chat).

In various embodiments, notifications of the pairings are provided at 312. In certain embodiments, the remote server 108 of FIG. 1 notifies a user of the electric vehicle 12 along with an owner (or operator) of the charging station 13 as to the pairing, for example via a wireless transmission and/or message.

Also in certain embodiments, ratings information is provided at 314. In various embodiments, the user of the electric vehicle 12 is provided information as to the rating of the paired charging station 13 (e.g., via the remote server 108, in certain embodiments). Also in various embodiments, the owner of the charging station 13 is provided information as to the rating of the paired vehicle 12 (e.g., via the remote server 108, in certain embodiments). In various embodiments, the user of the paired electric vehicle 12 and the owner of the paired charging station 13 are allowed to accept or reject the proposed pairing (e.g. by responding to the notification via a response message, and/or by clicking a button or selection on an applicable user electronic device 15, input device 86, and/or system 21 of FIG. 1).

A determination is made at 316 as to whether the pairing has been accepted. In certain embodiments, the pairing is determined to be accepted if both the user of the paired electric vehicle and the owner of the charging station have agreed to (and/or, in certain embodiments, have not disagreed to) the pairing. In various embodiments, this determination is made by a processor (e.g., a processor of the servers 54 of FIG. 1, and/or the processor 38 and/or a processor of the system 21 of FIG. 1).

In certain embodiments, as part of 316, the acceptance and/or rejection of the pairing may also be made automatically, via one or more processors (such as those described above) based on one or more acceptance thresholds for the user of the electric vehicle or the owner of the charging station. For example, in certain embodiments, for a particular user of an electric vehicle, the pairing may be accepted only for a charging station having a rating that exceeds a predetermined threshold (e.g., based on prior instructions and/or preferences provided by the particular user of the electric vehicle). Similarly, in certain embodiments, for a particular owner of a charging station, the pairing may be accepted only for a user of a vehicle having a rating that exceeds a predetermined threshold (e.g., based on prior instructions and/or preferences provided by the particular owner of the charging station). By way of additional examples, in certain embodiments, (i) a particular charging station may only be viewed (e.g., in a display and/or chat) by users of vehicles with ratings that exceed a predetermined threshold, and/or (ii) a particular electric vehicle may only be viewed (e.g., in a display and/or chat) by owners of charging stations with ratings that exceed a predetermined threshold.

If it is determined that the pairing has not been accepted, then the process proceeds to 318. During 318, a new, alternate pairing is generated. In certain embodiments, the alternate pairing of 318 uses similar factors and procedures as in the above-described step 310. In certain embodiments, certain additional information may also be utilized, for example including any additional notes and/or instructions made by the user of the electric vehicle and/or the owner of the charging station in rejecting the initial pairing.

Conversely, if it is instead determined that the pairing has been accepted, then a confirmation of the paring is provided at 320. Specifically, in various embodiments, at 320, for each pairing, a confirmation of the pairing is provided to the user of the electric vehicle 12 and the owner of the charging station 13 as to the pairing, for example via a wireless transmission and/or message (e.g., from the remote server 18 of FIG. 1).

In addition, in various embodiments, charging instructions are also provided at 322. In various embodiments, at 322, instructions are provided for both the paired electric vehicle (e.g., to update its charging status and to travel to the paired charging station and prepare for charging) and also to the paired charging station (e.g., to update its status as unavailable and to prepare to receive and charge the battery of the paired electric vehicle). In certain embodiments, the instructions are provided via one or more wireless transmissions and/or messages (e.g., from the remote server 18 of FIG. 1).

In various embodiments, the charging is performed at 324. Specifically, in various embodiments, for each pairing, the pairing of the paired electric vehicle is charged via the paired charging station.

Also in various embodiments, during the charging, monitoring is performed at 326 with respect to both the electric vehicle and the charging station, for use in updating their respective ratings. In various embodiments, video images are obtained via a camera onboard the vehicle with respect to the use of the charging station (and as to before and after conditions of the charging station), and data is collected via sensors onboard the electric vehicle as to performance of the charging station. Accordingly, in various embodiments, monitoring is performed as to whether the user of the electric vehicle has properly used the charging station in a timely manner and left the charging station in good condition, as well as to the conditions of the charging station in general and the performance of the charging station. In addition, in various embodiments, monitoring is also provided as to charging performance by the charging station, charge rate data, and electricity cost data (e.g. as obtained via sensors of the vehicle and/or charging station, and/or via usage and cost data obtained by the owner system 21 of FIG. 1, and/or via separate data and/or messages). In various embodiments, the monitoring is performed by a processor of the servers 54 of the remote server 18 of FIG. 1, using the camera images and other sensor data. In certain embodiments, the monitoring may be performed via the processor 38 of FIG. 1, a processor of the system 21 of FIG. 1, and/or one or more other computer processors.

In addition, in certain embodiments, as part of the monitoring, feedback may be obtained by the owner of the electric vehicle with respect to the charging station (or owner thereof), or vice versa. By way of example, such feedback may include, among other possible feedback (i) ratings of the user and owner (e.g., on a scale of one to five, in one embodiment) and (ii) personal comments provided by the user and the owner, among other possible feedbacks.

Figure 7:
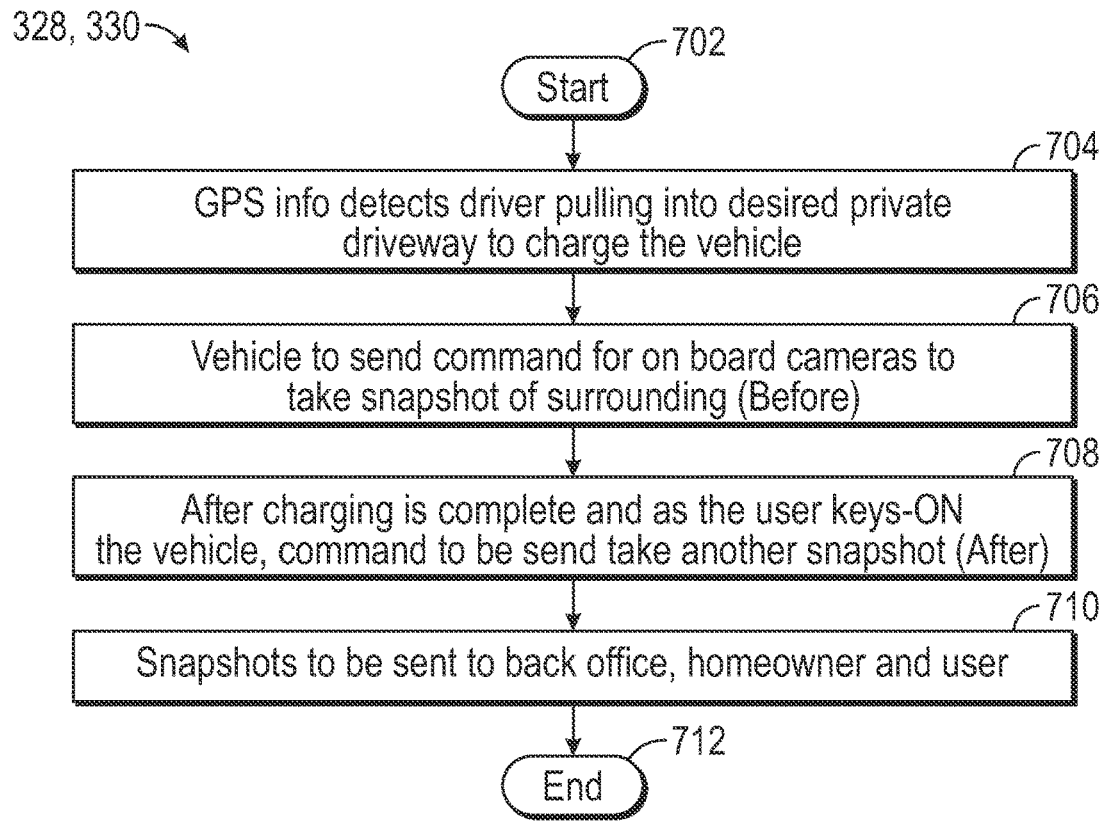
FIG. 7 is a flowchart of a sub-process of the process of FIG. 3, namely of monitoring during charging of the electric vehicle via the charging station, in accordance with exemplary embodiments.
Figure 9:
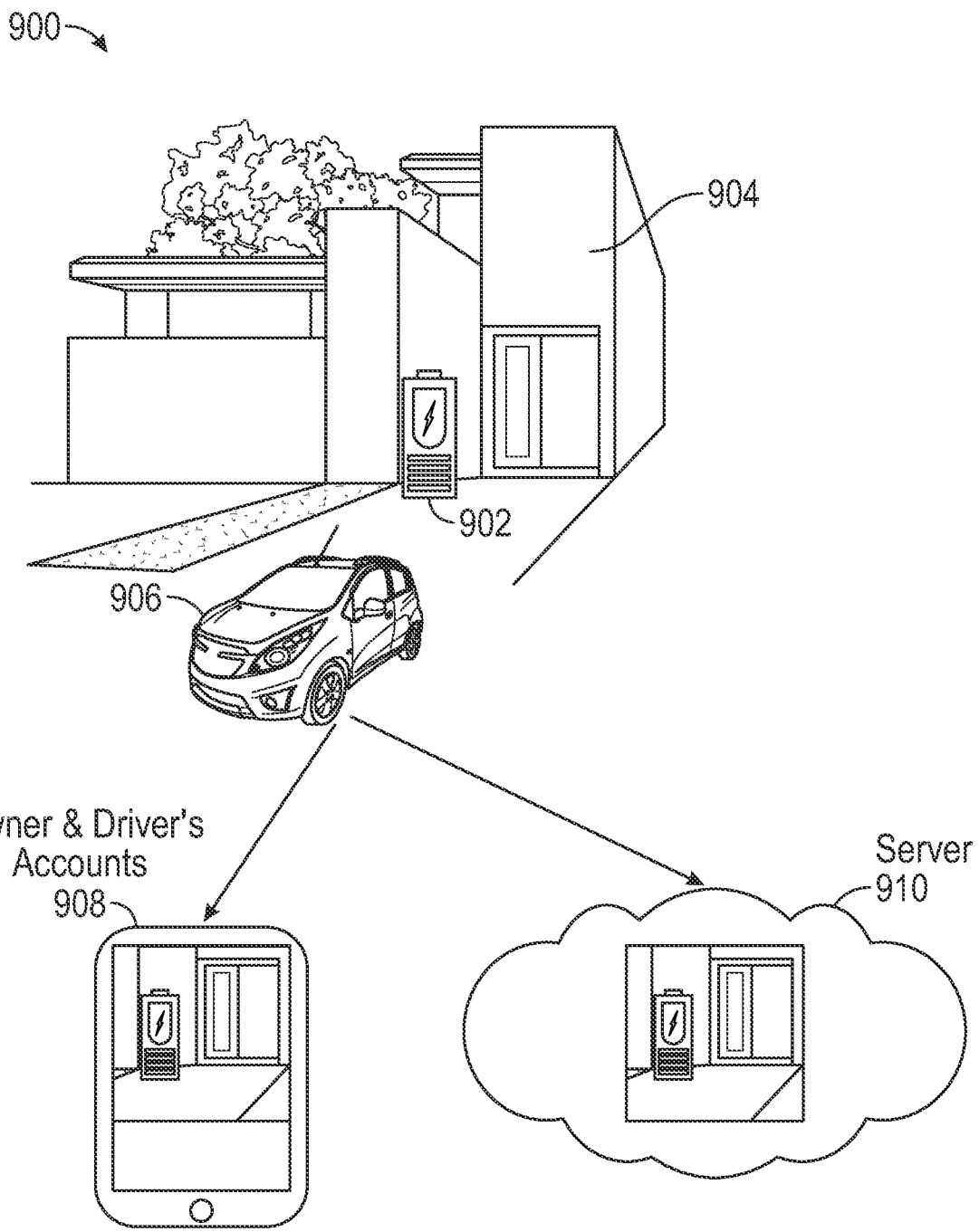
FIG. 9 is an illustration of the monitoring an exemplary platform for charging electric vehicles, and that can be utilized in connection with the communications system of FIG. 1, the modules of FIG. 2, and the process of FIG. 3, including the sub-processes of FIGS. 4, 5, and 7, and the illustration of FIG. 6, in accordance with exemplary embodiments.

FIG. 7 is a flowchart of the monitoring step 326 of FIG. 3, in accordance with exemplary embodiments. As shown in FIG. 7, in certain embodiments, once the step (or sub-process) begins at 702, a detection is made at 704 as to the electric vehicle entering a driveway or other area in proximity to the charging station (e.g., via information from the GPS chipset/component 42 of the vehicle 12). Also in certain embodiments, at 706 the electric vehicle 12 (e.g., the processor 38 thereof) sends commands for one more onboard cameras (e.g., the camera(s) 78 of FIG. 1) to record images surrounding the charging station 13 as the vehicle 12 enters the charging station, before charging. In addition, in certain embodiments, after the charging is complete (e.g., when the user turns on the electric vehicle 12 or the electric vehicle 12 is moving or about to move away from the charging station 13), the electric vehicle 12 (e.g., the processor 38 thereof) sends additional commands at 708 for the camera(s) 78 to record additional images surrounding the charging station 13. In various embodiments, at 710 the images (before and after) are transmitted (e.g., via the transceiver 35 of FIG. 1) to the remote server 18 for analysis, as well as to the user of the electric vehicle 12 and the owner of the charging station 13, and the sub-process ends at 712. In certain embodiments, the capturing of the photographic images (and/or, in certain embodiments, the transmission and/or recording thereof) is triggered by one or more vehicle actions, such as the vehicle transmission being placed into a "reverse" or "park" gear, and/or based on the vehicle's location in proximity to the charging station (e.g., as determined via a GPS and/or other location device). In certain embodiments, the photographic images are captured, based on the vehicle actions, both at the start and end of the particular electric vehicle's usage of the particular charging station. With reference to FIG. 9 (described in greater detail further below), in various embodiments the monitoring steps depicted in FIG. 7 are performed as the electric vehicle 906 of FIG. 9 utilizes the charging station 902 of FIG. 9 (e.g., including photographs taken immediately before and after the electric vehicle 906's usage of the charging station 902), and the results of the monitoring steps (including the photographic images, as well as feedback and/or other applicable data) are utilized by the one or more servers 910 of FIG. 9 (e.g., corresponding to the remote server 108 of FIG. 1) to update the information and ratings pertaining to the electric vehicle 906 and the charging station 902 and store the information in a database 908 (e.g., corresponding to the databases 56 of the remote server 18 of FIG. 1) with respect to separate accounts for the user of the electric vehicle and the owner of the charging station.

With reference back to FIG. 3, in various embodiments ratings for the electric vehicle (and/or the user thereof) and for the charging station (and/or the owner thereof) are updated at 328. In various embodiments, one or more processors (e.g., of the servers 54 of the remote server 18 of FIG. 1) analyze the camera images from step 326, sensor data from step 326, electricity usage and/or cost information from step 326, and/or feedback from the user of the electric vehicle 12 and/or the owner of the charging station 13 from step 326, and update the ratings of the electric vehicle and the charging station accordingly based on this information. For example, if an electric vehicle 12 is timely with its use of the charging station 13 and leaves the charging station 13 in good condition, then a positive or improved rating may be provided for the electric vehicle 12 (whereas a negative or reduced rating may otherwise be provided). Similarly, if a charging station 13 is timely available as promised, is in good condition, and provides charging performance consistent with applicable standards and expectations at a reasonable cost, then a positive or improved rating may be provided for the charging station 13 (whereas a negative or reduced rating may otherwise be provided). In various embodiments, the updated ratings are then stored in computer memory, such as databases 56 of the remote server 18 of FIG. 1, and/or the memory 40 of the vehicle 12 and/or memory of the system 21 of FIG. 1.

In addition, in various embodiments, user feedback may also be collected from the user of the electric vehicle with respect to the charging station that was used by the electric vehicle. For example, in certain embodiments, the user of the electric vehicle may provide written and/or other feedback with regards to the charging station (e.g., "charging station was broken", "location was messy"), the quality of the charging performed (e.g., "charging performed in accordance with expectations"), and so on. In certain embodiments, a processor may use artificial intelligence, natural language processing, and/or one or more other techniques to compile and/or analyze the user feedback and to provide appropriate actions pertaining to the charging station. For example, in certain embodiments, the charging station may be removed from the network until any problems are corrected. In other embodiments, the owner of the charging station may be provided a notification with instructions to remedy any problems that need to be corrected.

Also in various embodiments, one or more ratings-based actions are taken as appropriate at 330. For example, in certain embodiments, charging stations with higher or more improved ratings may be placed higher on a priority list as compared with other charging stations. Conversely, also in certain embodiments, charging stations with lower or less improved ratings may be placed lower on a priority list and/or may be removed altogether from the network of charging stations for the communications system 10 of FIG. 1 (e.g., until the charging station is improved and brought back up to applicable standards). Similarly, in certain embodiments, electric vehicles 12 may also be prioritized based on ratings and/or removed from altogether from the network of chargers for the communications system 10 under appropriate circumstances (e.g., if the user of a particular electric vehicle and/or its user have exhibited a pattern of improper usage of charging stations, or the like).

Figure 8:
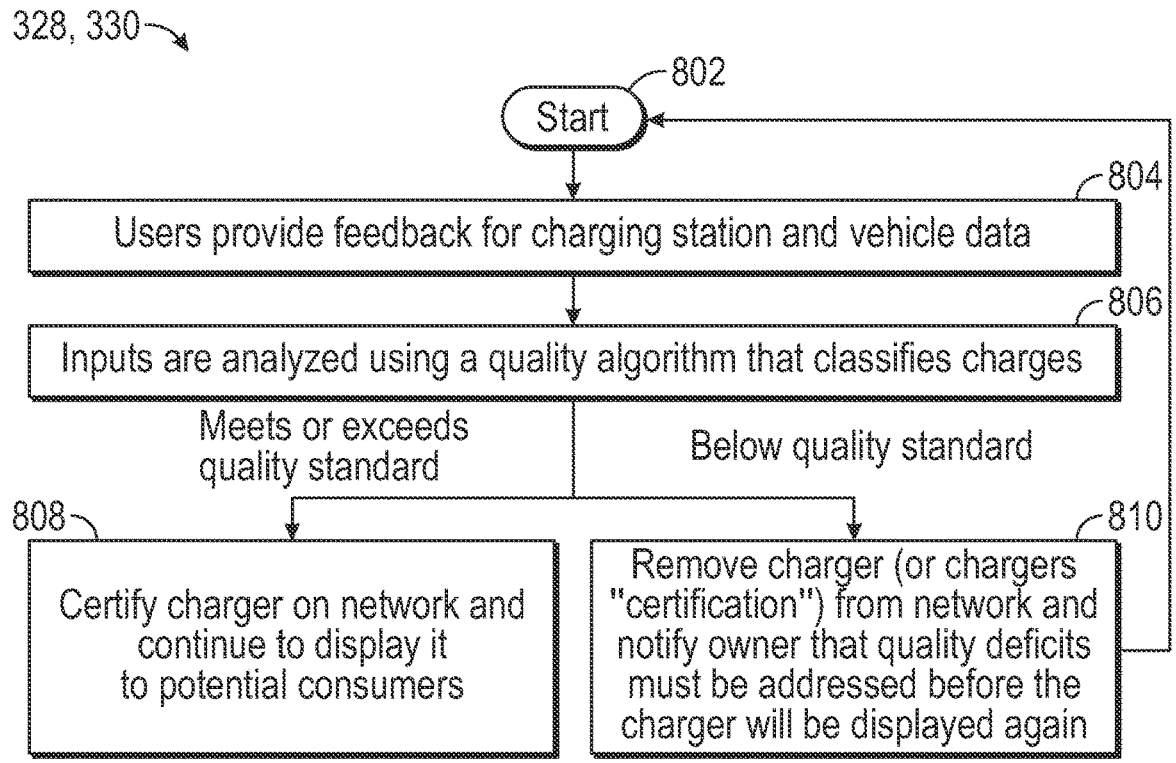
FIG. 8 is a flowchart of a sub-process of the process of FIG. 3, namely the sub-process of performing ratings-based actions for an electric vehicle charging platform, in accordance with exemplary embodiments.

With reference to FIG. 8, a flowchart is provided for combined steps 328-330 of FIG. 3, for updating the ratings and provided ratings-based actions, in accordance with exemplary embodiments. In certain embodiments, once these steps start at 802, the various information is provided for analysis by the remote server at 804 (e.g., including the camera images, sensor data, electricity and cost data, and user and owner feedback as described above). In certain embodiment, the information of 804 includes the above-discussed user feedback pertaining to the charging station, including written and/or other feedback with regards to the charging station (e.g., "charging station was broken", "location was messy"), along with information to cost of charging, performance, conditions, and other pertinent information pertaining to the charging station (such as described above) and the use thereof by the user of the electric vehicle. Also in certain embodiments, the information is analyzed at 806 by the remote server (e.g. by a computer processor thereof). In various embodiments, based on the analysis, the charging station may be certified at step 808 as meeting the required expectations (if quality requirements are met), or removed from the network at 810 (if quality requirements are not met) until the charging station attains compliance again.

Returning back to FIG. 3, in various embodiments, pairing data is updated at 332. For example, in various embodiments, an updated status is provided with respect to the charge status of the vehicle, the availability of the charging station, and the ratings of the electric vehicle and the charging stations (e.g., via instructions provided by one or more computer processors, such as the processor 38 of FIG. 1 and/or one or more processors of the servers 54 and/or system 21 of FIG. 1). Also in various embodiments, the process then terminates at 334.

With reference to FIG. 9, an illustration is provided of an exemplary platform 900 for charging an electric vehicle with a respective charging station, in accordance with exemplary embodiments. In various embodiments, the platform 900 of FIG. 9 can be utilized in connection with the communications system 10 of FIG. 1, the modules of FIG. 2, and the process 300 of FIG. 3, including the sub-processes of FIGS. 4, 5, 7, and 8, and the illustration of FIG. 6, in accordance with exemplary embodiments. As shown in FIG. 9, in various embodiments, an electric vehicle 906 (e.g., an electric vehicle 12 of FIG. 1 associated with a fleet of electric vehicles) is shown in proximity to a charging station 902 (e.g., a charging station 13 of FIG. 1 associated with a network of charging stations). As shown in FIG. 9, in certain embodiments, the charging station 902 is disposed outside or otherwise in proximity to a house or building 904 that is owned or operated by the owner of the charging station 902. Also in various embodiments, the pairing, instructions, and updating of the ratings and information is provided by one or more servers 910 (e.g., corresponding to the remote server 108 of FIG. 1) that are remote from the electric vehicle 906 and the charging station 902, and the information and ratings pertaining to the electric vehicle 906 and the charging station 902 are stored in a database 908 (e.g., corresponding to the databases 56 of the remote server 18 of FIG. 1) with respect to separate accounts for the user of the electric vehicle and the owner of the charging station, respectively.

Accordingly, in accordance with various embodiments, methods and systems are provided for controlling charging of electric vehicles using charging stations. In various embodiments, electric vehicles in a fleet of electric vehicles are paired with corresponding charging stations of a network of charging stations, based on vehicle data that includes a state of charge of the vehicle, and availability of the charging stations. Also in various embodiments, ratings for the electric vehicles and the charging stations are also maintained to further facilitate matching of the electric vehicles with respective charging stations, in addition to other information including feedback from electric vehicles regarding charging station conditions and functioning (e.g., as analyzed using natural language processing), photographic images of the conditions of the charging stations and indicative of treatment thereof by use of the electric vehicles, additional information regarding the electric vehicles and their users (e.g. driving histories), additional information regarding the charging stations (e.g., electricity costs and/or other costs of charging), online chats and messaging between users of the electric vehicles and owners of the charging stations, and/or various other information and interactions between the electric vehicles and the charging stations (and between the users and owners thereof).

It will be appreciated that the systems and methods may vary from those depicted in the Figures and described herein. For example, the communications system of FIG. 1, including the remote server, the vehicles, the charging stations and platforms, the communications networks, and/or components thereof, may vary from that depicted in FIG. 1 and/or described herein, in various embodiments. It will similarly be appreciated that the modules may vary from the depictions in FIG. 2 and the accompanying descriptions. It will also be appreciated that the processes (and/or subprocesses) disclosed herein may differ from those described herein and/or depicted in FIGS. 3-5, 7, and 8, and/or that steps thereof may be performed simultaneously and/or in a different order as described herein and/or depicted in these Figures. It will similarly be appreciated that the illustrations of FIGS. 6 and 9 may vary, among other possible variations.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof

What is claimed is:

1. A method for controlling charging for a plurality of electric vehicles, each of the plurality of electric vehicles including a respective battery that is charged electrically via a respective charger, the method comprising:
    obtaining vehicle data from the plurality of electric vehicles, the vehicle data including respective charge statuses for the respective batteries of the plurality of electric vehicles, via sensors onboard the plurality of electric vehicles;
    obtaining charging station data pertaining to a plurality of charging stations, the charging station data including respective availabilities for the plurality of charging stations, wherein, for one or more of the charging stations, the charging station data includes a time in which scheduled availability will begin based on when one of the electric vehicles that is currently using the charging station is expected to be finished;
    pairing one or more of the plurality of electric vehicles each with a respective one of the plurality of charging stations, generated paired sets of electric vehicles and charging stations, based on the vehicle data and the charging station data, including, for the one or more charging stations, the time in which scheduled availability will begin based on when the one of the electric vehicles that is currently using the charging station is expected to be finished, via a processor; and
    controlling charging of respective batteries of the one or more of the plurality of electric vehicles with the respective paired charging stations, via the processor.

2. The method of claim 1, wherein the availability for a particular charging station is based also at least in part on a schedule of available days and times of days that have previously established for the particular charging station.

3. The method of claim 2, wherein the availability of the particular charging station is enforced via instructions provided by the processor that automatically disconnects charging capability for the charging station for days and times in which the owner has decided that the charging station is to be unavailable.

4. The method of claim 2, wherein only certain users of electric vehicles, belonging to an allowed users list, are allowed to use the charging station during dates and times when the charging station is not scheduled to be available to the public.

5. The method of claim 1, further comprising, for a particular electric vehicle and a particular charging station that is paired with the particular electric vehicle:
    providing, to an owner of the particular charging station, rating information pertaining to the particular electric vehicle that is paired with the particular charging station; and
    allowing the owner of the particular charging station to accept or reject charging of the battery of the particular electric vehicle via the particular charging station, based on the rating information.

6. The method of claim 5, wherein the rating information pertaining to the vehicle is based at least in part on a driving history of the vehicle.

7. The method of claim 5, further comprising:
    monitoring usage of the particular charging station by the particular electric vehicle as the particular electric vehicle is charged at the particular charging station; and
    updating the rating information for the particular electric vehicle based on the monitoring;
    wherein the monitoring is performed using a camera that is embedded within the particular electric vehicle and that is utilized for capturing camera data while the particular electric vehicle is using the particular charging station, and wherein the rating information is updated based on the camera data from while the particular electric vehicle is using the particular charging station.

8. The method of claim 7, wherein capturing of photographic images via the camera is trigged by one or more vehicle actions.

9. The method of claim 1, further comprising, for a particular electric vehicle and a particular charging station that is paired with the particular electric vehicle:
providing, to a user of the particular electric vehicle, rating information pertaining to the particular charging station that is paired with the particular electric vehicle; and
allowing the user of the particular electric vehicle to accept or reject charging of the battery of the particular electric vehicle via the particular charging station, based on the rating information.

10. The method of claim 9, further comprising:
monitoring conditions of the particular charging station as the particular electric vehicle is charged at the particular charging station; and
updating the rating information for the particular charging station based on the monitoring.

11. The method of claim 1, further comprising:
initiating an online chat between two or more of the plurality of vehicles to switch charging positions at one or more of the plurality of charging stations based at least in part on the vehicle data, including a state of charge for one or more of the plurality of vehicles.

12. The method of claim 1, wherein the pairing of the one or more of the plurality of electric vehicles each with a respective one of the plurality of charging stations is also based on respective ratings of the plurality of electric vehicles and the plurality of charging stations, in combination with respective rating thresholds thereof for pairing.

13. The method of claim 1, wherein the vehicle data and the charging station data are obtained regardless of whether a particular electric vehicle is currently plugged into a charging station, and regardless of whether or not a particular charging station is currently being used to charge an electric vehicle.

14. The method of claim 1, further comprising:
obtaining feedback from the user of a particular electric vehicle with respect to a particular charging station used by the particular electric vehicle.

15. A system for controlling charging for a plurality of electric vehicles, each of the plurality of electric vehicles including a respective battery that is charged electrically via a respective charger, the vehicle system comprising:
a plurality of sensors disposed onboard the plurality of electric vehicles, the plurality of sensors configured to obtain vehicle data from the plurality of vehicles, the vehicle data including respective charge statuses for the respective batteries of the plurality of electric vehicles; and
a processor configured to at least facilitate:
obtaining charging station data pertaining to a plurality of charging stations, the charging station data including respective availabilities for the plurality of charging stations, wherein, for one or more of the charging stations, the charging station data includes a time in which scheduled availability will begin based on when one of the electric vehicles that is currently using the charging station is expected to be finished;
pairing one or more of the plurality of electric vehicles each with a respective one of the plurality of charging stations, generated paired sets of electric vehicles and charging stations, based on the vehicle data and the charging station data including, for the one or more charging stations, the time in which scheduled availability will begin based on when the one of the electric vehicles that is currently using the charging station is expected to be finished; and
controlling charging of respective batteries of the one or more of the plurality of electric vehicles with the respective paired charging stations.

16. The system of claim 15, further comprising:
a camera that is embedded within the particular electric vehicle;
wherein the processor is configured to at least facilitate, for a particular electric vehicle and a particular charging station that is paired with the particular electric vehicle:
providing, to an owner of the particular charging station, rating information pertaining to the particular electric vehicle that is paired with the particular charging station;
allowing the owner of the particular charging station to accept or reject charging of the battery of the particular electric vehicle via the particular charging station, based on the rating information;
monitoring usage of the particular charging station by the particular electric vehicle, using images provided by the camera while the particular electric value is using the particular charging station, as the particular electric vehicle is charged at the particular charging station; and
updating the rating information for the particular electric vehicle based on the monitoring, including the camera images from while the particular electric value is using the particular charging station.

17. A communication system comprising:
an electric vehicle including:
an electric motor;
a battery for powering the electric motor;
a charger for electrically charging the battery; and
a plurality of sensors disposed onboard the electric vehicle and configured to generate vehicle data including a charge status for the battery; and
a remote server that is disposed remote from the electric vehicles, the remote server comprising a processor that is configured to at least facilitate:
obtaining the vehicle data from the plurality of sensors;
obtaining charging station data pertaining to a plurality of charging stations, the charging station data including respective availabilities for the plurality of charging stations, wherein, for one or more of the charging stations, the charging station data includes a time in which scheduled availability will begin based on when one of the electric vehicles that is currently using the charging station is expected to be finished;
pairing the electric vehicle with a particular one of the charging stations, based on the vehicle data and the charging station data including, for the one or more charging stations, the time in which scheduled availability will begin based on when the one of the electric vehicles that is currently using the charging station is expected to be finished; and
controlling charging of the battery with the particular one of the charging stations.

18. The method of claim 1, wherein the step of obtaining the charging station data comprises obtaining the charging station data from the plurality of charging stations, wherein the plurality of charging stations are located at different buildings operated by different operators, including at different homes of the plurality of different operators.

19. The method of claim 1, wherein:
the step of obtaining the charging station data comprises obtaining electricity costs of the plurality of charging stations; and
the step of pairing the one or more of the plurality of electric vehicles each with the respective one of the plurality of charging stations is performed using the electricity costs.

20. The method of claim 19, wherein:
the step of obtaining the charging station data comprises obtaining electricity costs of the plurality of charging stations for different dates and times; and
the step of pairing the one or more of the plurality of electric vehicles each with the respective one of the plurality of charging stations is performed using the electricity costs for the plurality of charging stations for the different dates and times.

* * * * *